Jan. 30, 1923.
E. ATWOOD.
SPINDLE DRIVING MECHANISM.
FILED AUG. 13, 1921.
1,443,335
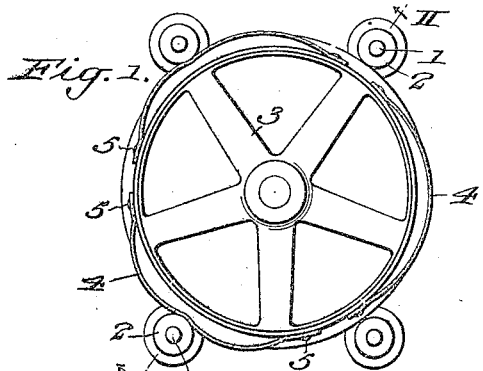
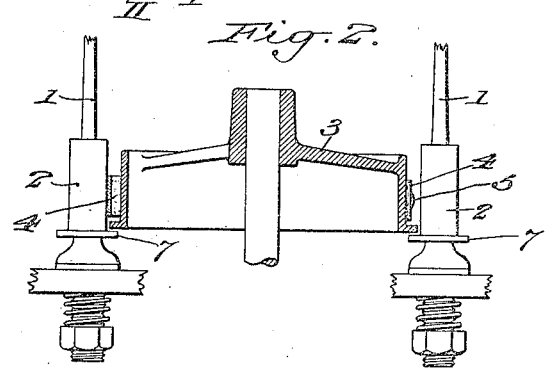
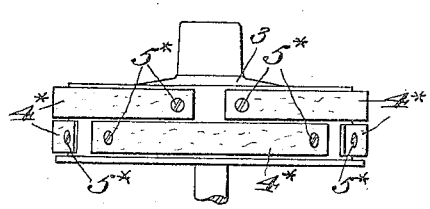
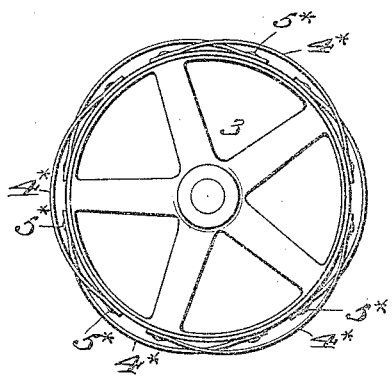
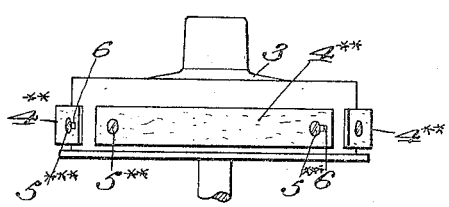
Inventor:-
Eugene Atwood
by attorneys Patented Jan. 30, 1923.

1,443,335

UNITED STATES PATENT OFFICE.

EUGENE ATWOOD, OF STONINGTON, CONNECTICUT, ASSIGNOR TO ATWOOD MACHINE COMPANY, OF STONINGTON, CONNECTICUT, A CORPORATION OF NEW JERSEY.

SPINDLE-DRIVING MECHANISM.

Application filed August 13, 1921. Serial No. 492,010.

*To all whom it may concern:*

Be it known that I, EUGENE ATWOOD, a citizen of the United States, and resident of Stonington, in the county of New London and State of Connecticut, have invented a new and useful Improvement in Spindle-Driving Mechanism, of which the following is a specification.

The object of my invention is to provide a novel means for driving spindles, said means including a spindle driving pulley having one or more yielding elements arranged in position to frictionally engage the spindle whorl for driving it. My invention more particularly includes a spindle driving pulley having one or more bulging flexible straps of leather or other suitable fabric so arranged that the centrifugal force, due to the rotary movement of the pulley, will keep the flexible straps bulging away from the pulley, except where they are attached thereto, so as to cause the straps to yieldingly engage the spindle whorls with a friction driving contact.

Practical embodiments of my invention are represented in the accompanying drawings, in which—

Fig. 1 represents one embodiment of my spindle driving pulley in top plan, in operative relation with four spindles.

Fig. 2 represents a detail section taken in the plane of the line II—II of Fig. 1.

Fig. 3 represents a spindle driving pulley of modified form, in side elevation.

Fig. 4 represents a top plan view of the same, and

Fig. 5 represents, in side elevation, a spindle driving pulley of another form.

The spindle herein shown is denoted by 1 and its whorl by 2. The spindle driving pulley is denoted by 3.

The spindle driving pulley 3 is provided with one or more yielding elements adapted to be thrown out by centrifugal force into position to frictionally engage the spindle whorls 2.

In the embodiment shown in Figs. 1 and 2, I have shown three of these yielding elements which are bulging flexible straps 4 secured at their ends by suitable fastening means, such as screws 5, to the periphery of the pulley 3. Sufficient fulness is provided in each of the straps between its ends to ensure its being thrown out by the centrifugal force due to the rotary movement of the pulley into position to yieldingly frictionally contact with the spindle whorls 2 for driving the same.

In the embodiment shown in Figs. 3 and 4, I have shown a plurality of overlapping bulging flexible straps 4* so as to obtain a more continuous driving action on the spindle whorl. These straps 4* are secured at their ends by suitable fastening means such as screws 5*, to the periphery of the pulley 3. In the form shown in Fig. 5, I have shown one end of each strap 4 as fixedly secured to the pulley by the screw 5 while the other end of the strap is secured to the pulley by the screw 5* so that it may have a slight movement. This may be provided for by a elongated slot 6 in the strap through which the fastening screw 5* passes.

The driving pulley 3 is preferably provided with a flange 7 which projects beyond the straps at their points of attachment to the pulley so that the spindle whorl may be adjusted properly to prevent the attached ends of the straps from striking the spindle whorl.

These yielding elements may be made of any suitable material such, for instance, as leather straps.

By the provision of the spindle driving pulley with one or more yielding elements I am enabled to secure a very effective driving connection between the pulley and the spindle whorl, said connection being one consuming a minimum amount of power and ensuring high speed for the spindle.

It is evident that various changes may be made in the construction, form and arrangement of the several parts without departing from the spirit and scope of my invention; hence I do not wish to limit myself to the particular embodiments herein shown and described, but

What I claim is:

1. A spindle driving pulley having one or more yielding elements adapted to be thrown out by centrifugal force into position to frictionally engage the spindle whorl.

2. A spindle driving pulley having one or more bulging flexible elements adapted to be thrown out by centrifugal force into position to frictionally engage the spindle whorl.

3. A spindle driving pulley having one or more bulging flexible straps adapted to be thrown out by centrifugal force into position to frictionally engage the spindle whorl.

4. A spindle driving pulley having one or more bulging flexible straps adapted to be thrown out by centrifugal force into position to frictionally engage the spindle whorl, each strap being secured at one end to the pulley.

5. A spindle driving pulley having one or more bulging flexible straps adapted to be thrown out by centrifugal force into position to frictionally engage the spindle whorl, each strap being secured at both ends to the pulley.

6. A spindle driving pulley having a plurality of overlapping bulging flexible straps adapted to be thrown out by centrifugal force into position to frictionally engage the spindle whorl.

7. A spindle driving pulley having one or more bulging flexible straps adapted to be thrown out by centrifugal force into position to frictionally engage the spindle whorl, each strap being secured at one end to the pulley, said pulley having a flange projecting beyond the strap at its point of attachment to the pulley.

8. A spindle driving pulley having one or more bulging flexible straps adapted to be thrown out by centrifugal force into position to frictionally engage the spindle whorl, each strap being secured at both ends to the pulley, said pulley having a flange projecting beyond the strap at its points of attachment to the pulley.

In testimony, that I claim the foregoing as my invention, I have signed my name this 4th day of August 1921.

EUGENE ATWOOD.